(12) United States Patent
Ito

(10) Patent No.: US 6,330,739 B1
(45) Date of Patent: *Dec. 18, 2001

(54) CAULKING METHOD

(75) Inventor: Makoto Ito, Kariya (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,933

(22) Filed: Apr. 19, 1999

(30) Foreign Application Priority Data

Apr. 20, 1998 (JP) .................................. 10-109428

(51) Int. Cl.7 .................................................. B23P 11/00
(52) U.S. Cl. .......................................... 29/513; 29/243.56
(58) Field of Search .............................. 29/509, 513, 861, 29/862, 863, 515, 517, 243.56

(56) References Cited

U.S. PATENT DOCUMENTS

| | | | |
|---|---|---|---|
| 2,759,256 | * 8/1956 | Bergan | 29/515 |
| 3,146,519 | * 9/1964 | Redwine | 29/862 |
| 3,643,327 | * 2/1972 | Jackson | 29/517 |
| 3,871,071 | * 3/1975 | Luongo | 29/863 |
| 3,995,870 | * 12/1976 | Hulek | 29/243.56 |

* cited by examiner

Primary Examiner—David P. Bryant
(74) Attorney, Agent, or Firm—Pillsbury Winthrop LLP

(57) ABSTRACT

A first member having a pair of claws and an engagement recess provided between the pair of claws and a second member having an engagement portion are prepared. In a state where the engagement portion of the second member is disposed in the engagement recess of the first member, the pair of claws is externally held by a side face jig. Then, a punch having a trapezoid recess composed of a pair of inclined parts and a horizontal part between the inclined parts is brought to contact with front end portions of the caulking claws. The punch is pushed to bent the caulking claws along the inclined parts, and is further pushed to upset the caulking claws by the horizontal part. As a result, the first member is securely caulked with the second member.

9 Claims, 7 Drawing Sheets

CAULKING METHOD

CROSS REFERENCE TO RELATED APPLICATION

This application is based upon and claims the benefit of Japanese Patent Application No. 10-109428, filed on Apr. 20, 1998, the contents of which are incorporated herein by reference.

BACKGROUND OF THE INVENTION

1. Field of the Invention

This invention relates to a method for caulking two members and an apparatus used for the method.

2. Description of the Related Art

Figure 14:
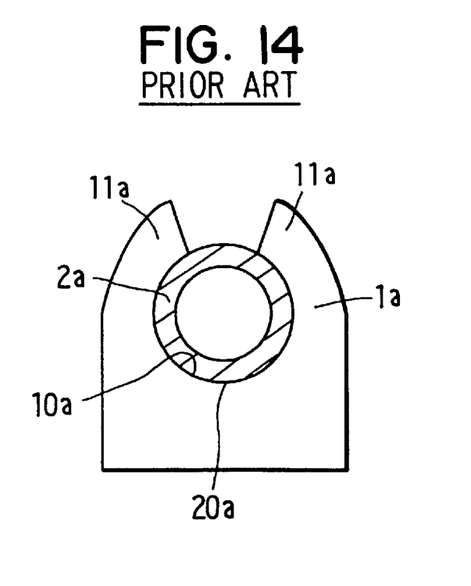
FIG. 14 is an explanatory view showing first and second members caulked with one another in a prior art.
Figure 15:
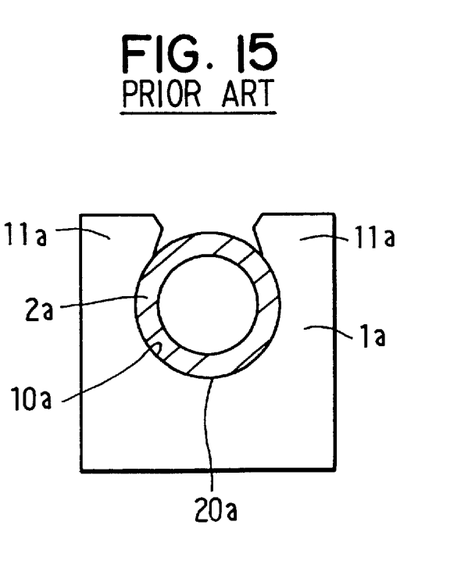
FIG. 15 is an explanatory view showing first and second members caulked with one another in another prior art.

Two members can be fixed with one another by a so-called caulking method. For instance, as shown in FIG. 14, the caulking method is carried out to a first member 1a formed with two caulking claws 11a and an engagement recess 10a, and to a second member 2a having an engagement portion 20a that is disposed in the recess 10a. In this state, the caulking claws 11a are bent along the outer surface of the second member 2a to hold the second member 2a. Otherwise, as shown in FIG. 15, the caulking claws 11a are upset inward by flat pushing jigs to hold the second member 2a.

Figure 16:
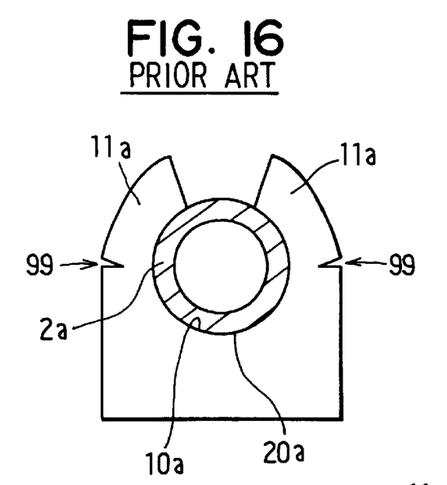
FIGS. 16–19 are explanatory views showing caulking deficiencies according to prior arts.

However, in the methods described above, there arise the following problems. That is, when the caulking claws 11a are bent by caulking, as shown in FIG. 16, cracks 99 are liable to occur on the outer surfaces of the caulking claws 11a due to tensile stress that is produced on the outer surface side during the caulking.

Figure 17:
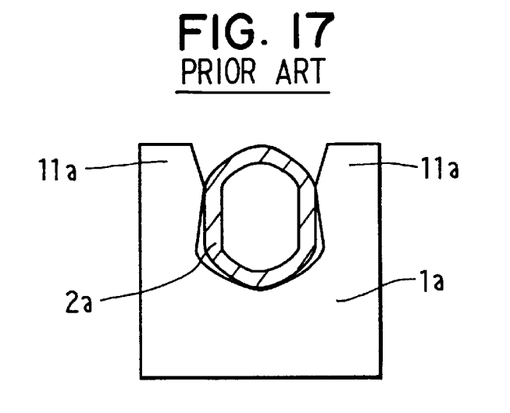
Figure 18:
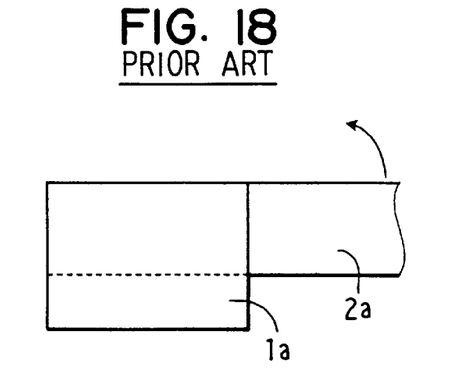
Figure 19:
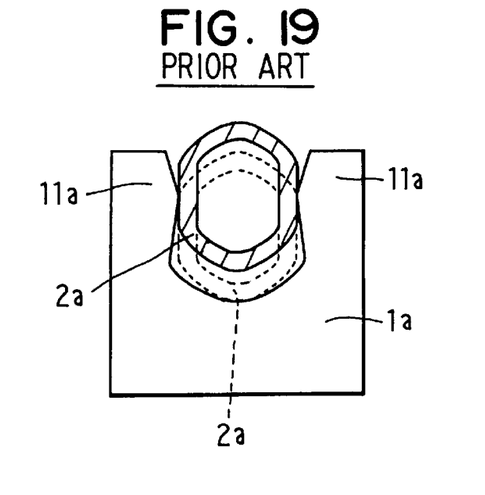

When the caulking claws 11a are upset by caulking, cracks do not occur; however, as shown in FIG. 17, central portions of the caulking claws 11a may expand during the upsetting when rigidity of the second member 2a is smaller than that of the first member 1a. In such a case, as shown in FIGS. 18 and 19, the second member 2a can be easily detached from the first member 1a by levering.

SUMMARY OF THE INVENTION

The present invention has been made in view of the above problems. An object of the present invention is to provide a caulking method for easily and securely fixing two members and an apparatus used for the method.

According to the present invention, a first member having a pair of claws opposed to one another and an engagement recess provided between the pair of claws is caulked with a second member having an engagement portion. Specifically, after disposing the engagement portion of the second member in the engagement recess of the first member, outer faces of the pair of claws are externally held by a first jig. Then, a second jig is brought to contact with front end portions of the pair of claws. The second jig has a generally trapezoid recess with a pair of first processing walls that contact the front end portions of the pair of claws and a second processing wall interposed between the pair of first processing walls. Next, the pair of claws is bent along the pair of first processing walls to reach the second processing wall, respectively, by pushing the second jig. Successively, the pair of claws is upset by the second processing wall by further pushing the second jig.

That is, according to the present invention, the pair of claws is upset after they are bent inward by the second jig while being held externally by the first jig. As a result, the first member is securely caulked with the second member without expanding in an opposite side of the second member and without producing cracks thereon. The first and second jigs can be easily manufactured, resulting in low cost.

The first member is preferably disposed on a base so that the engagement recess is open on an opposite side of the base for holding the second member therein. Preferably, the first processing walls are inclined walls relative to the second processing wall, and the second processing wall is a flat wall. Preferably, inflected joint-portions are provided between the first processing walls and the second processing wall to prevent stress concentration thereon.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS

A caulking method for fixing and an apparatus used for the method in a preferred embodiment of the present invention will be explained referring to FIGS. 1 to 5.

Figure 1:
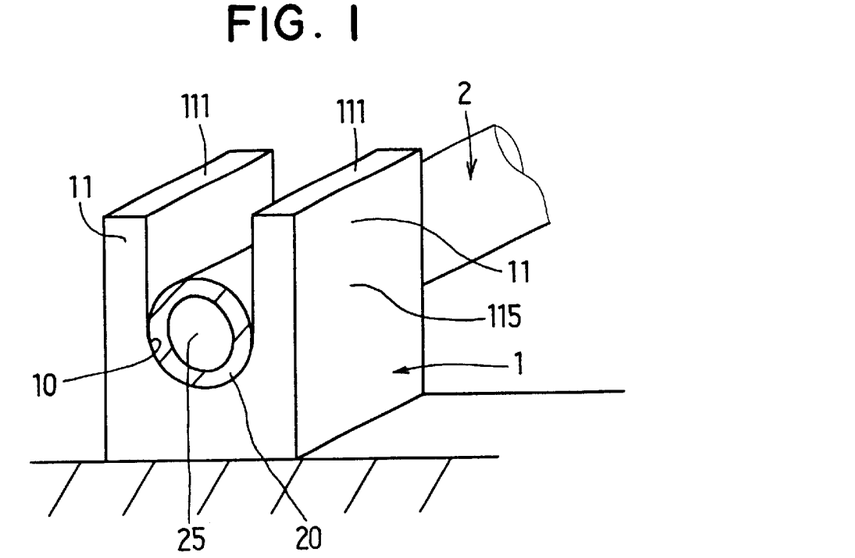
FIG. 1 is an explanatory view showing a state where first and second members are engaged with one another in a first preferred embodiment.
Figure 2:
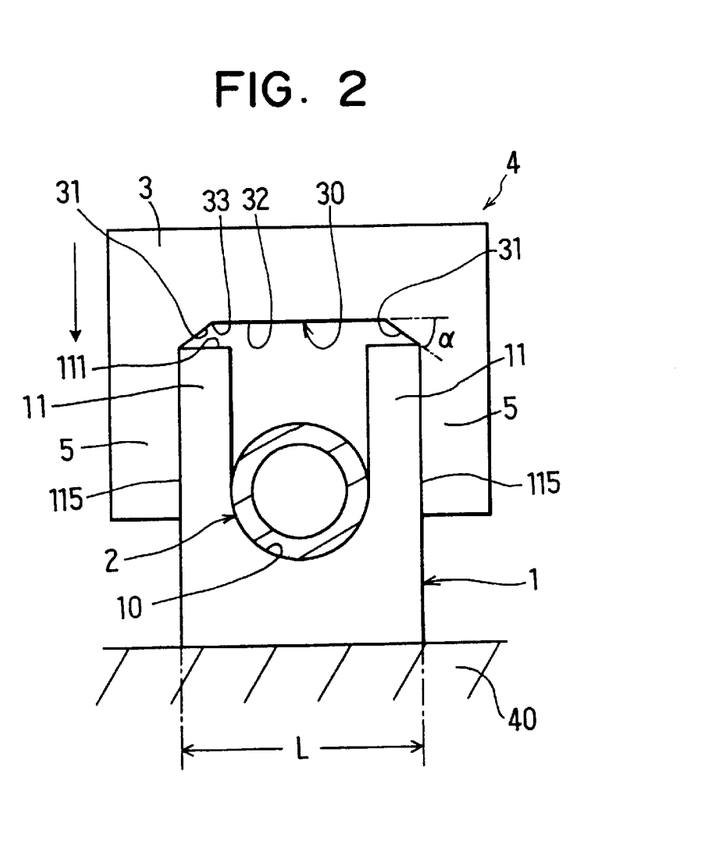
FIG. 2 is an explanatory view showing a state where a caulking process starts in the first embodiment.

Referring to FIGS. 1 and 2, a caulking apparatus 4 in the present embodiment fixes a first member 1 to a second member 2 by caulking so that the first member 1 fixedly holds (grasps) the second member 2. The first member 1 is formed with a pair of caulking claws 11 and an engagement recess 10 having an ark-like shape in cross-section. That is, the first member 1 has a generally U-like shape in cross-section. The second member 2 has an engagement portion 20 that is capable for being inserted into the engagement recess 10. The second member 2 in the present embodiment is a cylindrical member having a hollow portion 25 inside thereof. It is preferable that the external form of the engagement portion 20 corresponds to the internal form of the engagement recess 10.

The caulking apparatus 4 has, as shown in FIG. 2, a base 40 to which the first member 1 is set, and a side face jig (first jig) 5 for supporting the pair of claws 11 by externally holding it, and a caulking punch (second jig) 3 for bending and upsetting the claws 11. The caulking punch 3 has a generally trapezoid recess 30 composed of a pair of inclined parts 31 as first processed faces, and a horizontal part 32 as a second processed face that is provided between the inclined parts 31 through inflected joint-portions 33.

More specifically, the member 1 is put on the flat base 40. The caulking punch 3 and the side face jig 5 are integrated with one another to form a U-like shape as a whole. A pair of sides of the U-like shape member serves as the side face jig 5, and a bottom part of the U-like shaped member serves as the trapezoid recess 30. In the trapezoid recess 30, an inclination $\alpha$ between the inclined parts 31 and the horizontal part 32 is preferably in a range of 30 degrees to 75 degrees and, in the present embodiment, is set at 45 degrees. The inclination a is determined so that the caulking claws 11 abutting the inclined parts 31 are smoothly deformed by bending.

When the inclination $\alpha$ is smaller than 30 degrees, component forces for pushing the caulking claws 11 inward become small not to smoothly bend the caulking claws 11. On the other hand, when the inclination a exceeds 75 degrees, the inclined parts 31 crush the caulking claws 11 from both sides of the caulking claws 11. This may cause a problem such that the second member 2 may be deformed.

Figure 3:
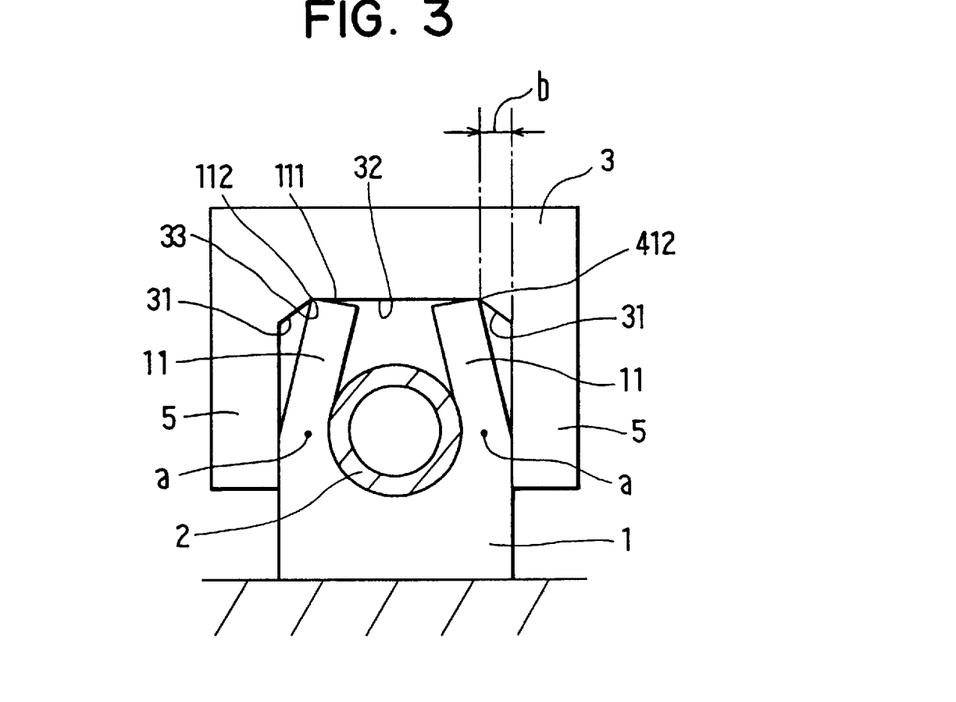
FIG. 3 is an explanatory view showing a state where a bending step is finished in the first embodiment.

Further, as shown in FIG. 3, a length b of each of the inclined parts 31 parallel to the horizontal part 32 is 3 mm. The length b is set to be smaller than a length corresponding to a component length that is parallel to the horizontal part 32 and is obtained by converting an allowable bending amount of the caulking claws 11. That is, it is preferable that the caulking claws 11 is not bent to exceed the inclined parts 31. Accordingly, cracks to the caulking claws can be prevented. The inflected joint-portions 33 (see FIG. 2) are composed of curved faces to prevent stress concentration thereon. The side face jig 5 has a gap corresponding to a length L between outer surfaces 115 of the pair of caulking claws 11 so that inside faces thereof smoothly and slidably if move on the outer surfaces 115 of the claws 11 through lubricating oil.

When caulking is practically carried out using the caulking apparatus 4, as shown in FIG. 1, first, the engagement portion 20 of the second member 2 is disposed in the engagement recess 10 of the first member 1. Next, as shown in FIG. 2, the caulking punch 3 integrally formed with the side face jig 5 is attached so as to cover an opening portion side of the caulking claws 11 of the first member 1, and is pushed by force. In this state, front end portions 111 of the caulking claws 11 face the inclined parts 31 of the punch 3.

After that, as shown in FIG. 3, the front end portions 111 of the caulking claws 11 are gradually bent inward along the inclined parts 31 of the trapezoid recess 30. The bending processing smoothly progresses until outer side edges 112 of the front end portions 111 of the caulking claws 11 reach the inflected joint-portions 33 between the inclined parts 31 and the horizontal part 32.

Figure 4:
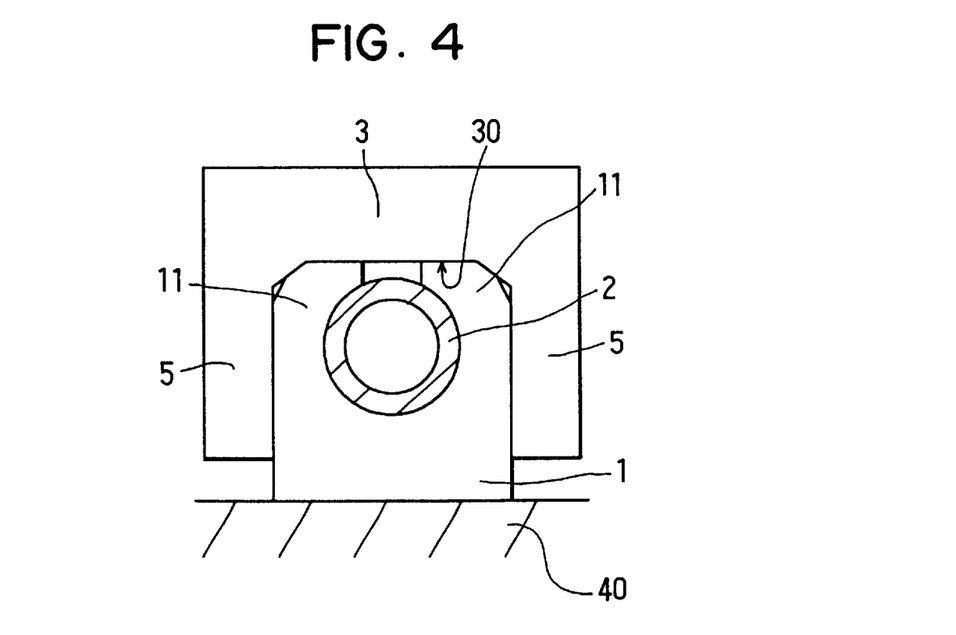
FIG. 4 is an explanatory view showing a state where an upsetting step is finished in the first embodiment.
Figure 5:
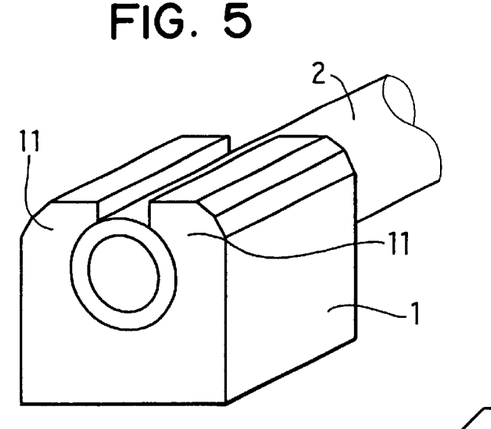
FIG. 5 is a perspective view showing the first and second members caulked with one another in the first embodiment.

Then, the caulking punch 3 is further pushed by force so that the outer side edges 112 of the caulking claws 11 is prohibited by the horizontal part 32 from moving inward with a generally involute-like locus. At the same time, the outer side edges 112 of the caulking claws 11 are prohibited by the inclined parts 31 from moving outward due to slippage to the horizontal part 32. Accordingly, upsetting starts in the state where the caulking claws 11 are engaged with the inflected joint-portions 33. Thus, the upsetting (processing) progresses while inclining the caulking claws 11. Therefore, as shown in FIGS. 4 and 5, the caulking claws 11 are deformed to fixedly hold the second member 2, thereby being fixed to the second member 2.

In the present embodiment described above, two kinds of processing of bending and upsetting the caulking claws 11 are successively carried out using the caulking punch 3 with the trapezoid recess 30 and the side face jig 5. Accordingly, the caulking is very smoothly carried out. Especially, in the present embodiment, the inclination $\alpha$ and the length b of each inclined part 31 are set reasonably as described above. Therefore, the bending amount and the timing for starting the upsetting are appropriately controlled. Even when tensile stress is produced on the outer surfaces of the caulking claws 11 by bending, the tensile stress can be canceled by compressive stress that is produced by upsetting. As a result, cracks do not occur to the caulking claws 11. In addition, since the caulking claws 11 are externally held by the side face jig 5, the claws 11 can be deformed without expanding outwardly. Consequently, the two members 1, 2 are strongly fixed to one another. Incidentally, in the present embodiment, the flat inclined parts 31 are used as first processing faces (walls) and the flat horizontal part 32 is used as a second processing face (wall); however, curved surfaces having relatively large curvatures may be used as the processing faces.

(Second Embodiment)

Figure 6:
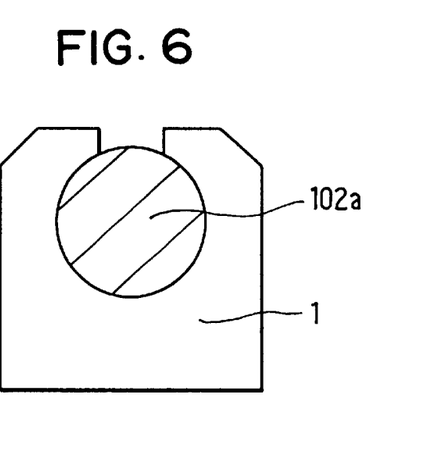
FIG. 6 is an explanatory view showing first and second members caulked with one another in a second preferred embodiment.

In a second preferred embodiment, as shown in FIG. 6, a metallic second member 102a is used without having a hollow portion therein in place of the second member 2 in the first embodiment. The other features and effects are the same as those in the first embodiment.

(Third Embodiment)

Figure 7:
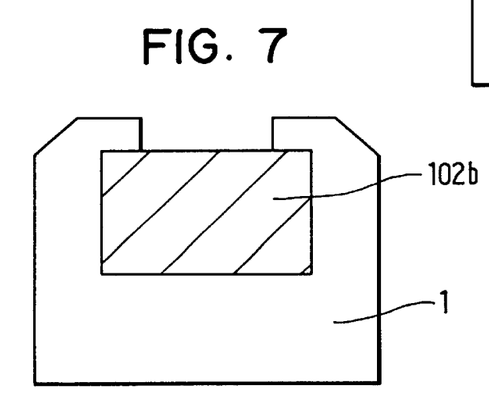
FIG. 7 is an explanatory view showing first and second members caulked with one another in a third preferred embodiment.

In a third preferred embodiment, as shown in FIG. 7, a metallic second member 102b having a rectangular shape in cross-section is used without having a hollow portion therein in place of the second member 2 in the first embodiment. The other features and effects are the same as those in the first embodiment.

(Fourth Embodiment)

Figure 8:
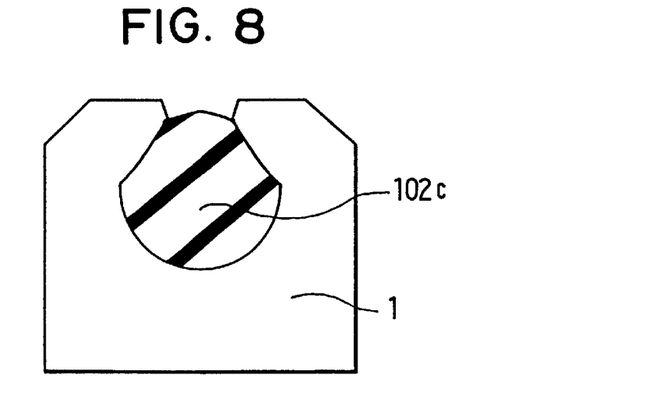
FIG. 8 is an explanatory view showing first and second members caulked with one another in a fourth preferred embodiment.

In a fourth preferred embodiment, as shown in FIG. 8, a rubber second member 102c is used in place of the second member 2 in the first embodiment. In this case, the second member 102c slightly deforms during the processing; however, the caulking claws 11 can be deformed by caulking to fixedly hold the second member 102c as in the first embodiment. This means that the fixing method of the present invention can exhibit the same effect even when the second member 102c is made of elastic material having rigidity that is smaller than that of the first member 1. That is, the second member may be made of various materials such as metal, resin, and the like. On the other hand, the first member is preferably made of plastically deformable metallic material. The other features and effects are the same as those in the first embodiment.

(Fifth Embodiment)

Figure 9:
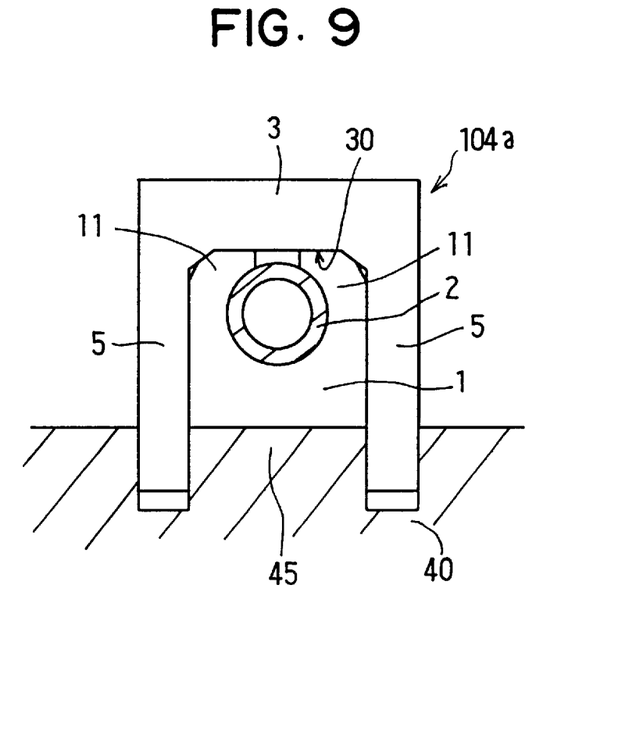
FIG. 9 is an explanatory view showing a state where an upsetting step is finished in a fifth preferred embodiment.

In a fifth preferred embodiment, a caulking apparatus 104a shown in FIG. 9 is used with a specification that is modified from that of the caulking apparatus 4 in the first embodiment. That is, as shown in the figure, a base 40 of the caulking apparatus 104a is formed with a protruding base portion 45 having a width approximately equal to that of the first member 1. Further, a length of the side face jig 5 formed with the caulking punch 3 is lengthened as compared to that in the first embodiment. The other features are the same as those in the first embodiment.

In this case, the first member 1 is more securely fixed during the processing, so that the caulking, i.e., the bending and upsetting of the claws 11 are more smoothly carried out. Further, the effect of preventing deformation of undesirable parts of the first member 1 is enhanced. The other effects are the same as those in the first embodiment.

(Sixth Embodiment)

Figure 10:
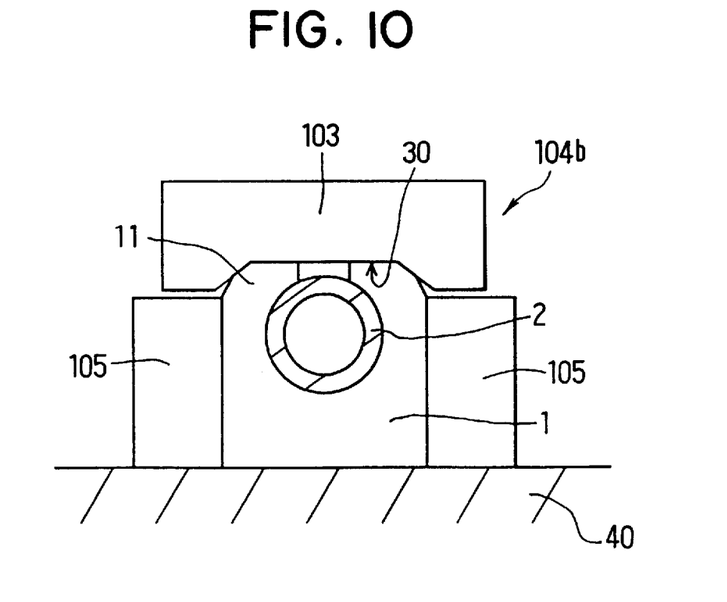
FIG. 10 is an explanatory view showing a state where an upsetting step is finished in a sixth preferred embodiment.

As shown in FIG. 10, a caulking apparatus 104b used in a sixth preferred embodiment includes a caulking punch 103 and a side face jig 105, which are separately formed from one another. In the caulking punch 103, a trapezoid recess 30 is formed at a central portion of a lower face of a plate like member, as well as in the first embodiment. The side face jig 105 is composed of a pair of facing plate members and is fixed to the base 40 while externally holding (pinching) the first member 1. The other features are the same as those in the first embodiment. In this case, because it is not necessary to slidably move the side face jig 105 on the caulking claws 11 of the first member 1, a force for pushing the punch 103 during the caulking is reduced. Accordingly, the size of the caulking apparatus is reduced.

(Seventh Embodiment)

Figure 11:
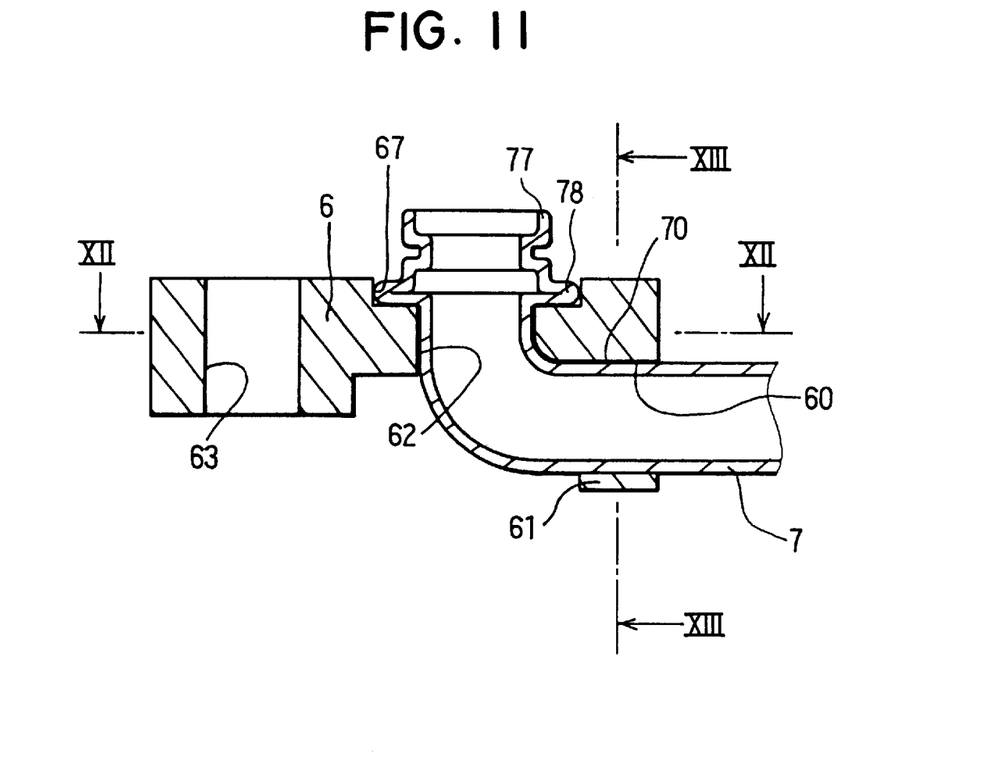
FIG. 11 is a cross-sectional view showing first and second members caulked with one another in a seventh preferred embodiment.
Figure 12:
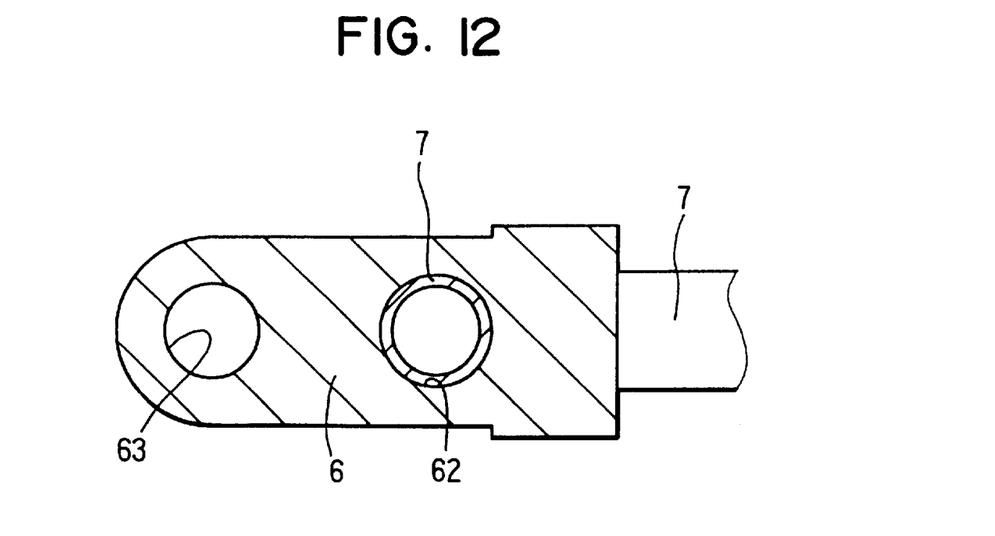
FIG. 12 is a cross-sectional view taken along a XII—XII line in FIG. 11.
Figure 13:
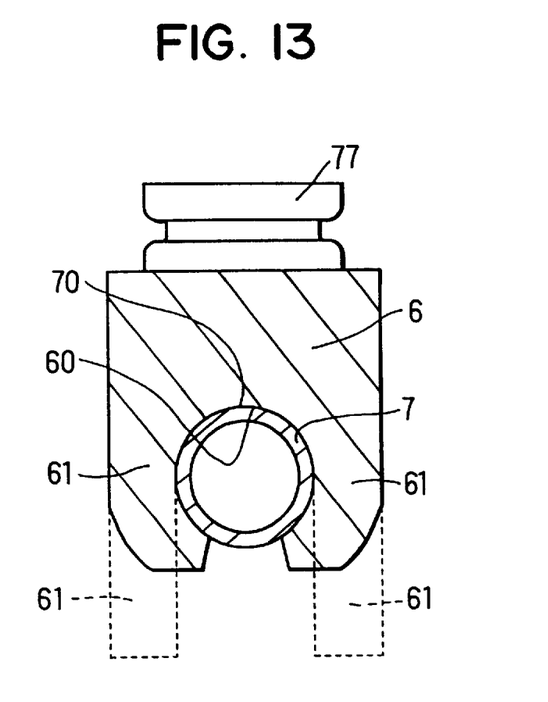
FIG. 13 is a cross-sectional view taken along a XIII—XIII line in FIG. 11.

A seventh preferred embodiment is a specific example in which the caulking method in the first embodiment is applied to a connector 6 made of die-cast as a first member, and to a pipe 7 for an air conditioner as a second member. As shown in FIGS. 11 and 13, the connector 6 has a pair of caulking claws 61 and an engagement recess 60 at an end thereof. As shown in FIGS. 11 and 12, the connector 6 further has first and second through holes 62, 63 passing therethrough in an upper and lower direction. The caulking claws 61 are, as indicated by broken lines in FIG. 13, U-shaped as in the first embodiment, and the engagement recess 60 is formed with an arc-like shape.

A bolt for fixing a counterpart (not shown) to the connector 6 is inserted into the first through hole 63. The pipe 7 is inserted into the second through hole 62. The second through hole 62 has an enlarged flange hole 67 on the upper portion thereof. An axial direction of the second through hole 62 makes 90 degrees with an axial direction of the engagement recess 60 provided between the caulking claws 61.

The pipe 7, which is previously bent at 90 degrees, is inserted into the second through hole 62 and the engagement recess 60 to have a head portion 77 thereof protruding from the second through hole 62. Then, the head portion 77 is deformed by bulging or the like, thereby forming a flange portion 78. The flange portion 78 is disposed in the flange hole 67. In this state, caulking is carried out using the caulking apparatus 4 in the first embodiment substantially in the same manner. Accordingly, as shown in FIGS. 11 to 13, an engagement portion 70 of the pipe is fixed to the connector 6 by the caulking claws 61. The other features are the same as those in the first embodiment.

While the present invention has been shown and described with reference to the foregoing preferred embodiments, it will be apparent to those skilled in the art that changes in form and detail may be made therein without departing from the scope of the invention as defined in the appended claims.

For instance, the constitution of the side face jig is not limited to those described above, and actuators such as a hydraulic cylinder may be used as a side face jig.

What is claimed is:

1. A method of caulking first and second members, comprising:

preparing the first and second members, the first member having a pair of claws opposed to one another and an engagement recess provided between the pair of claws, the second member having an engagement portion capable of being inserted into the engagement recess of the first member;

disposing the engagement portion of the second member in the engagement recess of the first member;

externally holding outer faces of the pair of claws by a first jig;

bringing a second jig into contact with outer side edges of the pair of claws, the second jig having a generally trapezoid recess with a pair of first processing walls that contact the outer side edges of the pair of claws, a second processing wall interposed between the pair of first processing walls, and inflected joint-portions provided between each of the pair of first processing walls and the second processing wall;

bending the pair of claws inward by moving the outer side edges of the pair of claws along the pair of first processing walls toward the second processing wall until the outer side edges of the pair of claws engage the inflected joint-portions; and upsetting the pair of claws by the second processing wall in a state that the outer side edges of the pair of claws are engaged with the inflected joint-portions.

2. The method of claim 1, wherein the inflected joint-portions are curved walls.

3. The method of claim 1, wherein the first processing walls are inclined walls relative to the second processing wall, and the second processing wall is a flat wall.

4. The method of claim 3, wherein an inclination between one of the inclined walls and the flat wall is in a range of 30 degrees to 75 degrees.

5. The method of claim 3, wherein a length of a projection of one of the inclined walls onto a plane parallel to the flat wall in a direction of said bending is smaller than an amount determined so that cracks are prevented from occurring within the pair of claws after said bending occurs.

6. The method of claim 1, wherein the first jig and the second jig are integrated with one another.

7. The method of claim 6, wherein the first jig and the second jig combine to form a generally U-shaped cross section as a whole.

8. The method of claim 1, wherein the first jig externally holds the pair of claws during the steps of bending and upsetting the pair of claws to prevent the pair of claws from expanding in a direction opposite the second member.

9. The method of claim 1, wherein the bending of the claws is stopped by the inflected joint-portions before the claws contact each other.

\* \* \* \* \*